(12) United States Patent
Schildan et al.

(10) Patent No.: US 8,549,529 B1
(45) Date of Patent: Oct. 1, 2013

(54) SYSTEM AND METHOD FOR EXECUTING MULTIPLE FUNCTIONS EXECUTION BY GENERATING MULTIPLE EXECUTION GRAPHS USING DETERMINED AVAILABLE RESOURCES, SELECTING ONE OF THE MULTIPLE EXECUTION GRAPHS BASED ON ESTIMATED COST AND COMPILING THE SELECTED EXECUTION GRAPH

(75) Inventors: Axel Schildan, Sunnyvale, CA (US); Frank Jargstorff, Oakland, CA (US); Kevin Michael Goldsmith, Mercer Island, WA (US); Gavin Miller, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 427 days.

(21) Appl. No.: 12/475,385

(22) Filed: May 29, 2009

(51) Int. Cl.
*G06F 9/46* (2006.01)

(52) U.S. Cl.
USPC .......................................................... 718/104

(58) Field of Classification Search
USPC .......................................................... 718/104
See application file for complete search history.

(56) References Cited

U.S. PATENT DOCUMENTS

| | | | |
|---|---|---|---|
| 5,671,403 A * | 9/1997 | Shekita et al. ......................... | 1/1 |
| 6,510,422 B1 * | 1/2003 | Galindo-Legaria et al. .......... | 1/1 |
| 6,915,290 B2 * | 7/2005 | Bestgen et al. ....................... | 1/1 |
| 7,739,267 B2 * | 6/2010 | Jin et al. ........................ | 707/718 |
| 2010/0191720 A1 * | 7/2010 | Al-Omari et al. ............. | 707/718 |
| 2010/0250564 A1 * | 9/2010 | Agarwal et al. ............... | 707/756 |

OTHER PUBLICATIONS

"Core Image Concepts", [Online]. Retrieved from the Internet: <URL: http://developer.apple.com/documentation/graphicsimaging/conceptual/CoreImaging/ci_concepts/ci_concepts.html>,(Jun. 9, 2008),8 pgs.

"Introduction to Core Image Programming Guide", [Online]. Retrieved from the Internet: <URL: http://developer.apple.com/documentation/GraphicsImaging/Conceptual/CoreImaging/ci_intro/ci_intro.html>,(Aug. 9, 2008),2 pgs.

* cited by examiner

*Primary Examiner* — Thomas Lee
*Assistant Examiner* — Xuxing Chen
(74) *Attorney, Agent, or Firm* — Schwegman Lundberg Woessner P.A.

(57) ABSTRACT

Various embodiments herein provide one or more systems, methods, software, and data structures for executing multiple functions using more than one resource within a computing system. Examples of functions comprise data processing filters and effects. Resources include, for example, a central processing unit (CPU) and a graphics processing unit (GPU). Based on an input graph received from a user, one or more execution graphs may be generated to indicate the resources to be used and data conversions to be performed.

22 Claims, 7 Drawing Sheets

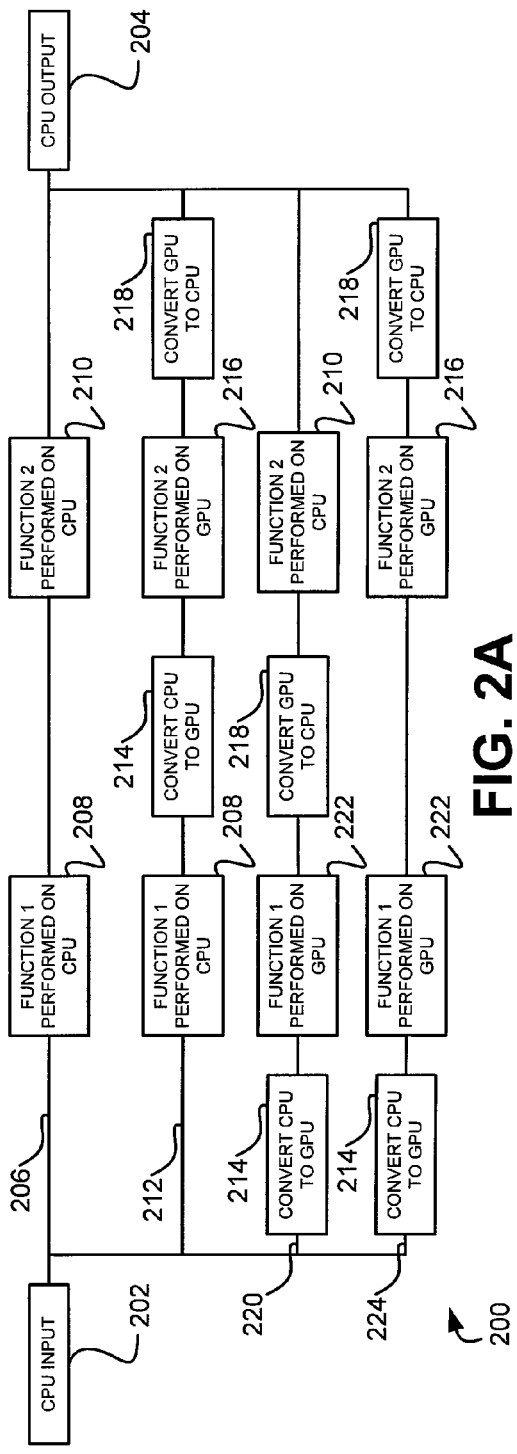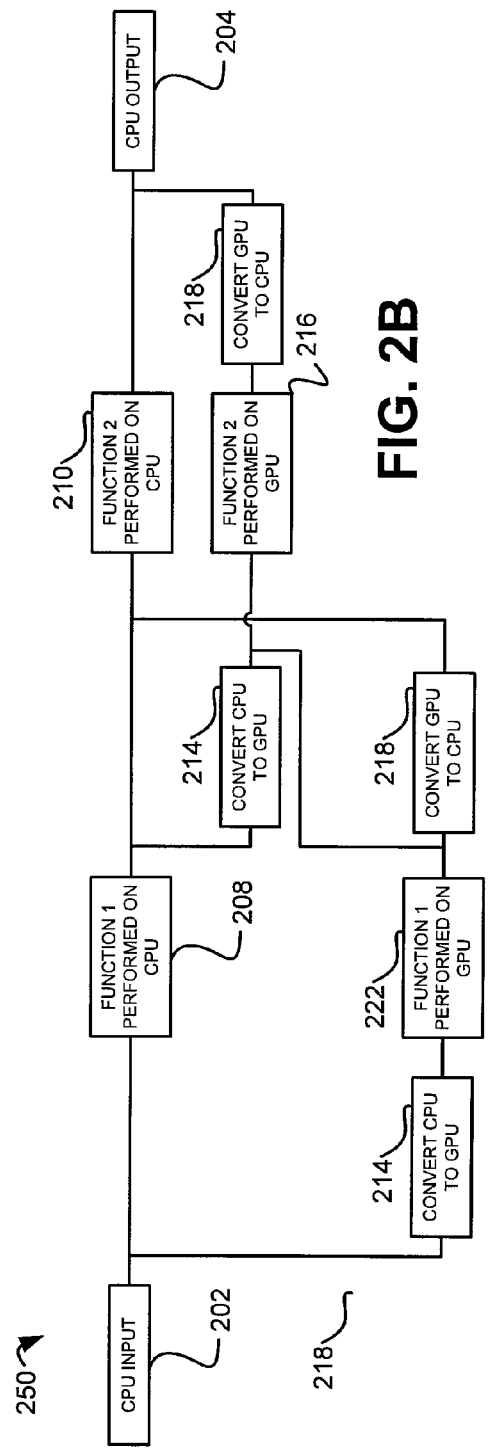

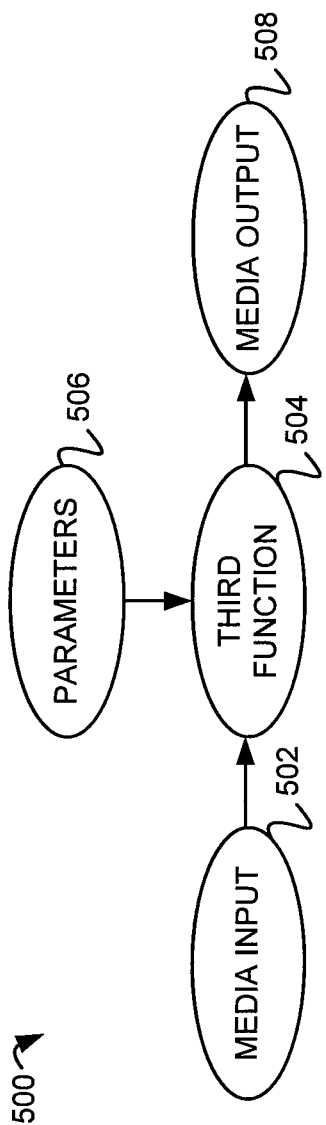
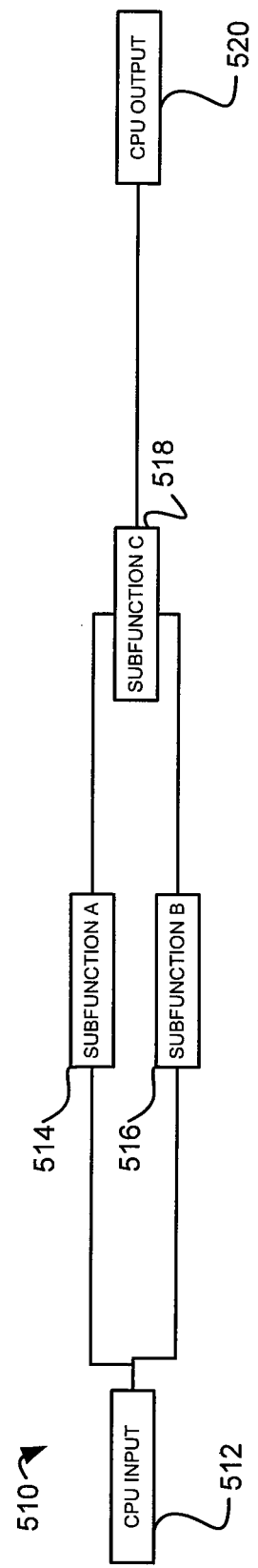
FIG. 5A
FIG. 5B

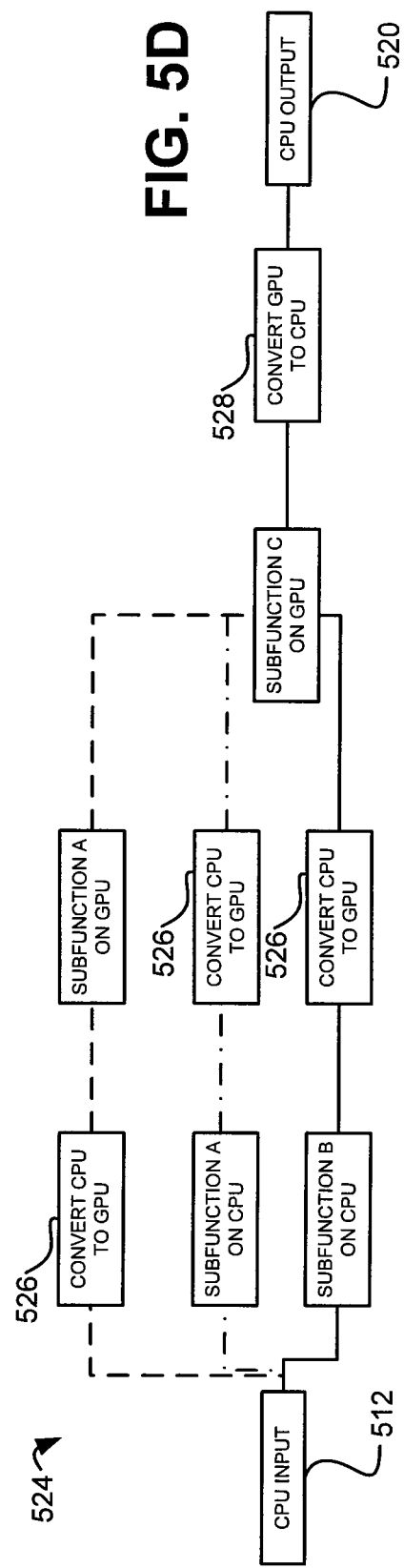

SYSTEM AND METHOD FOR EXECUTING MULTIPLE FUNCTIONS EXECUTION BY GENERATING MULTIPLE EXECUTION GRAPHS USING DETERMINED AVAILABLE RESOURCES, SELECTING ONE OF THE MULTIPLE EXECUTION GRAPHS BASED ON ESTIMATED COST AND COMPILING THE SELECTED EXECUTION GRAPH

BACKGROUND INFORMATION

Data processing programs (such as image processing programs and audio processing programs) typically include one or more filters or functions that can be used to modify media received from a user. Some of these filters are limited to being executed on a specific piece of hardware such as a central processing unit (CPU) or a graphics processing unit (GPU).

BRIEF DESCRIPTION OF THE DRAWINGS

FIG. 2A is a block diagram of multiple instances of an execution graph according to an example embodiment.

FIG. 2B is an alternative block diagram of the multiple instances of the execution graph of FIG. 2A.

FIGS. 5A-5D are an illustration of an example embodiment comprising a nested function.

DETAILED DESCRIPTION

Figure 1:
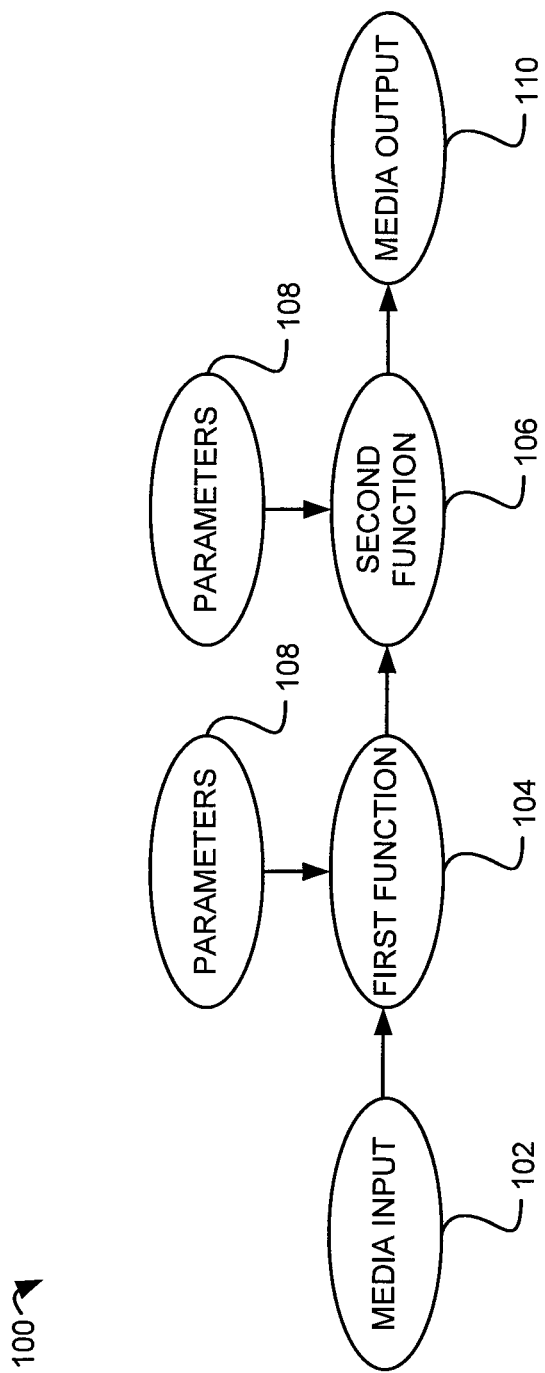
FIG. 1 is a block diagram illustration of an input graph according to an example embodiment.

Data processing techniques typically include functions that may be used to modify a media input (e.g., an audio file, an image or a series of images). Functions that are commonly used include, but are not limited to, blur, tint, fade, recolor, and filtering techniques. Well-known filters include Gaussian filters, anti-aliasing filters, and median filters. Multiple functions may be used to modify media to remove noise and/or to achieve a desired effect. Some resources within a computer or other machine may more efficiently perform a particular function than another resource. As such, it may be desirable to perform some functions within a first resource and other functions within another resource.

A computer or other machine being used to modify the media input may include multiple resources that are each able to execute at least a portion of the functions. The resources may include one or more processors that, in turn, may each support multiple computing platforms. Examples of processors include central processing units (CPUs) and graphic processing units (GPUs). Computing platforms may include application programming interfaces (APIs) such as Open CL and/or architectures (e.g., CUDA). For simplicity, each computing platform is referred to as a separate resource, even though it may be executed by one of the processors that are also referred to as resources. To illustrate, as used in connection with the embodiments described herein, examples of resources include CPUs, multi-core CPUs, multiple CPUs, integrated GPUs, multiple GPUs, and implementations of graphics or computer systems, such as OpenGL, OpenCL, Cuda, DirectX, and DirectX ComputeShader. For illustration, exemplary resources used herein to describe various embodiments are referred to as the "CPU" and the "GPU."

Some embodiments provide systems and approaches for receiving an input graph from a user that indicates one or more functions to be performed on the media input but does not necessarily indicate a specific resource to be used to execute each function. The input graph is described herein as being in graphical form but is understood to include textual or other representations of the functions to be performed. The input graph may be referred to as being "resource independent." The systems and approaches provided herein may automatically interrogate the resources and determine which resources will be used to build and/or execute each of the functions within the input graph. The determination may be based on reducing the memory footprint, reducing an execution time, generating higher precision output, avoiding overuse of a single resource, reducing a number of conversions to be performed, etc. To switch between resources, systems and approaches described herein may provide one or more conversions between the functions to convert data executable by one resource (e.g., a GPU) to data executable by another resource (e.g., the CPU). The terms "kernel" and "node" may be used to refer to functions and conversions inclusively.

Some embodiments may be desirable for functions that require a specific set of resources to be executed properly. For example, a box blur filter is typically optimized by a user to run on specific resources at various points during execution. Specifying these resources can be difficult and time-consuming. The embodiments described here may receive a command from a user via an input graph to apply a box blur filter to one or more images. The embodiments then identify the available resources and select the optimal set of resources to perform each portion of the box blur filter without additional input from the user. The selection may be based on, for example, memory footprint, execution time, improved accuracy, improved performance, resource scheduling, reduced conversions during execution of the function. In some instances, various embodiments may be used where the actual hardware resources that will be available are unknown when the function is generated. This aspect may be desirable for executing legacy functions on updated hardware resources.

In some instances, the data comprises an image or audio recording of a physical object captured by, for example, a camera or audio recorder. This data may be in an electronic format that is not understandable by a user, such as, for example, an array of numerical values representing pixels in an image. The systems and methods described herein may operate to receive the data and transform the data into a visual or audio depiction that is understandable by a user (e.g., an image). Further, some functions described herein may comprise, for example, processing data corresponding to an event and/or natural phenomena.

For example, image data of a physical object may be received from a digital camera in a computer-readable format such as a bitmap, jpeg, or other image file format. The approaches described here may operate to receive the data via an image processing application and transform the data. Transformations may include, for example, applying one or more filters to remove noise, sharpening or blurring the image, or applying a special effect. Special effects may include a kaleidoscope effect, a stained glass effect, an aging effect, converting a color image to a black and white image, or the like. The transformed image or image data may be displayed to the user as a visual depiction of the physical object. Audio data and other data may be transformed similarly using filters, special effects, and other techniques.

FIG. 1 is a block diagram illustration of an input graph 100 according to an example embodiment. The input graph 100 illustrates an exemplary input by a user to the approaches described herein. The input graph 100, when instantiated by a user, typically comprises a media input 102 and one or more functions such as first function 104 or second function 106. Each of the one or more functions may receive parameters 108 as inputs. The input graph 100 may further specify an output file format and/or location, such as media output 110.

The input graph 100 may be received via a user interface of a data processing program such as an image processing software application. The input graph 100 may be specified programmatically by an image processing application via an application programming interface (API) such as the FILTERGRAPH® API by ADOBE SYSTEMS INC. of San Jose, Calif. The input graph 100 may also be described in a text file (e.g., as used in PIXELBENDER® imaging software by ADOBE SYSTEMS INC. of San Jose, Calif.) by a user of an image processing application (e.g., PHOTOSHOP® or AFTER EFFECTS® image processing applications ADOBE SYSTEMS INC. of San Jose, Calif.). The input graph 100 may be received from a user as a graphical representation or as a programmatic representation (e.g., in a programming language). The input graph 100 may include one or more predefined functions or user-defined functions and one or more media inputs 102 that indicate one or more file locations of media inputs to be modified. Alternatively, the user may provide a data structure other than a graph, such as a text indicating one or more functions to be performed. Alternate diagrammatic formats may also be used.

In some instances, the term "a resource-independent input graph" is used to specify that an input graph (e.g., input graph 100) received from a user does not specify the resource used to execute at least one or, in some embodiments, all of the functions to be performed. The resource-independent input graph may or may not indicate a resource on which the input is to be received and/or the resource from which to access the output.

Input graph 100 specifies one or more functions (e.g., first function 104 and second function 106) to be performed. In some instances, the input graph 100 may include a media input 102 or a location where the media input 102 is located. The media input 102 may be associated with a specific resource. The input graph 100 may also include, in some embodiments, a location where the modified media input (i.e., media output 110) is to be stored and a resource associated with the media output 110. The input graph 100 may include one or more parameters 108 corresponding to a first function 104 and a second function 106. It is noted that the input graph 100 may or may not include an indication of the hardware that may be used to perform the functions within the input graph.

Functions within the input graph 100 may include, for example, first function 104 and second function 106. The first function 104 and/or the second function 106 may be predefined, user-defined, nested, and/or comprise a third-party filter that can be managed using the input graph 100. The input graph 100 typically dictates an order in which the functions are to be performed on the media input 102. The order in which the functions are to be performed may be referred to as an execution sequence. In some embodiments, the input graph 100 may indicate that two or more functions are to be performed in parallel or that the functions may or may not be reordered.

Examples of functions that may be included in an input graph 100 are familiar to those skilled in the art. These functions include, for example, blur, tint, fade, and the like. The functions may also include known filters such as Gaussian filters, salt-and-pepper filters, and the like. For example, other functions used in image processing to create a desired image may be included in the functions 104 and 106. These examples include a stained-glass effect, recolor effect, crackle-effect, and the like.

The functions 104 and 106 may receive parameters 108 as inputs. The parameters 108 may be the same or different for each of the functions 104 and 106. The parameters 108 may be provided at the same time the media input 102 is provided and/or may be received when the input graph 100 is generated. A parameter may include, for example, ranges, constants, or other variables used to execute one or more of the functions 104 and 106. In some instances, a first portion of the parameters 108 may be received when the input graph 100 is generated and a second portion of the parameters 108 may be received when a media input 102 is received. One or more of the parameters 108 may be associated with a default value.

The input graph 100 may indicate a format and/or location of an output file referred to here as media output 110. The media output 110 may be in the same format or a different format from the format and/or location of the media input 102. For example, in some instances the media input 102 may be in a CPU-compliant format while the media output 110 may be in a GPU-compliant format.

FIG. 2A is a graph 200 depicting multiple instances of execution graphs (e.g., execution graph 206, execution graph 212, execution graph 220 and execution graph 224) according to an example embodiment. In graph 200, each instance of the execution graph is depicted as a horizontal path between the CPU input 202 and CPU output 204. As used herein, an execution graph is a specification of the processes to be performed and the resource(s) to be used to execute a sequence of functions. An execution graph may be depicted visually as a path between an input and an output. To visually distinguish the input graph 100 from the graph 200, the various nodes are depicted as rectangles rather than ovals. The graph 200 depicts one or more nodes corresponding to the one or more resources that are inferred from the input graph 100 to perform the desired image or audio modification. It should be noted that there is only one input (e.g., CPU input 202) and only one output (e.g., CPU output 204) of the graph 200. Some embodiments of the graph 200 may have more than one input and/or more than one output.

The CPU input 202 indicates that a media input 102 is received or will be received via a process executed by the CPU of the computing system. The CPU output 204 indicates that the media output 110 will be stored and accessible via a process executed by the CPU of the computing system. In some instances, the media output 110 may be stored and/or accessed via a process executed by another resource of the computing system A first execution graph 206 of the graph 200 includes two functions 208 and 210 for performing the first function 104 and the second function 106 of the input graph 100 shown in FIG. 1. The function 208 corresponds to the first function 104 and indicates that this function is to be performed on the CPU. The execution graph 206 also includes CPU function 210, indicating that the second function 106 is also to be performed on the CPU. In operation, the first function 104 may comprise a blur function, for example, and the second function 106 may comprise a tint function. The function 208 corresponding to the first function 104 indicates that the CPU is to perform the blur function and that the function 210 corresponding to the second function 106 indicates that the CPU is also to perform the tint function.

The second execution graph 212 includes function 208 to perform first function 104 on the CPU and a second function 216 to be performed on the GPU instead of the CPU. To do this, conversion 214 is inserted into the second execution graph 212 to convert the output of function 208 into GPU-readable data that can be processed by the GPU. Function 216 may receive the GPU data generated by the conversion 214 to perform a second function 106. Because the output of function 216 is GPU-readable and the output 204 is designated as a CPU format, a second conversion 218 is inserted into execution graph 212.

The graph 200 further includes execution graph 220 and execution graph 224, which operate to perform the first function 104 on the GPU in a function 222, and as described above, conversions 214 and 218 are inserted into the execution graphs 220 and 224 as needed.

FIG. 2B is an alternative depiction 250 of graph 200 of the multiple instances of the execution graph of FIG. 2A. The alternative depiction 250 is used to show how, in some instances, the graph 200 can be expressed.

The graph 250 may be useful in various embodiments, particularly where more than two resources are available. For example, in addition to a CPU and a GPU, other architectures or platforms may also be available. For example, a GPU may operate other resources, such as OpenGL, OpenCL, and CUDA, and switching between the resources within the GPU may also require a conversion. Even more so, in these embodiments, a direct conversion may not be possible. For example, if a first function 104 is performed on a CUDA-enabled GPU and a second function is to be performed on a CPU, two conversions may be used (e.g., a CUDA-to-GL function and a GL-to-CPU function).

The graph 200 or the condensed graph 250 may be used in conjunction with a shortest path algorithm to determine a most efficient execution graph or instance within the graph to perform the functions provided by the user. Examples of shortest path algorithm include, but are not limited to, Dijkstra's algorithm and an A* search algorithm.

Figure 3:
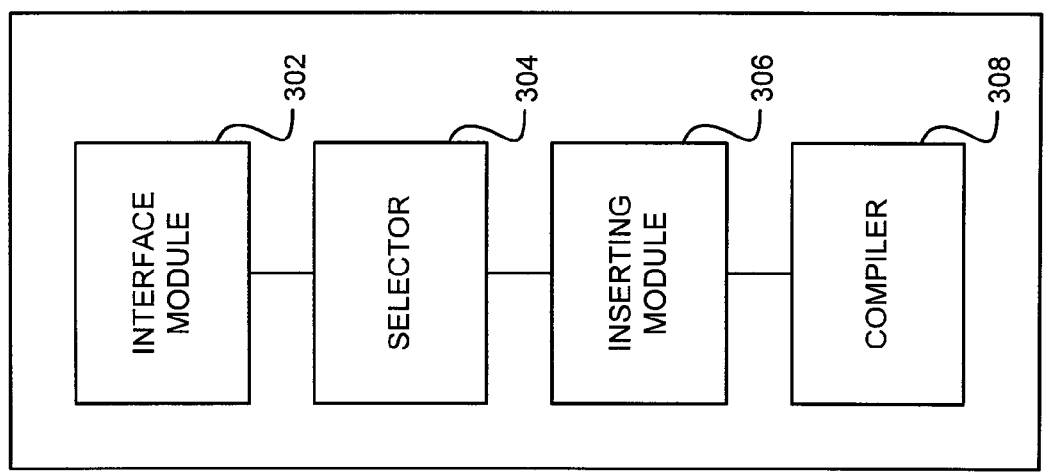
FIG. 3 is a block diagram of a system according to an example embodiment.

FIG. 3 is a block diagram of a system 300 according to an example embodiment. The system 300 may comprise an interface module 302, a selector 304, an inserting module 306, and a compiler 308. The interface module 302 may receive an input graph (e.g., input graph 100) from a user and/or provide the media output 110 to the user.

The selector 304 may determine whether a function in the input graph 100 is executable by each of one or more available resources. The selector 304 may further select an available resource to execute each function based in part on an execution sequence depicted in the input graph 100. Based on the selection, the inserting module 306 may insert a conversion into an execution graph (e.g., conversion 214 in the first execution graph 212) to convert an output at one resource into an input at another resource.

The compiler 308 may compile the execution graph to be executed and perform the functions in the input graph 100.

Figure 4:
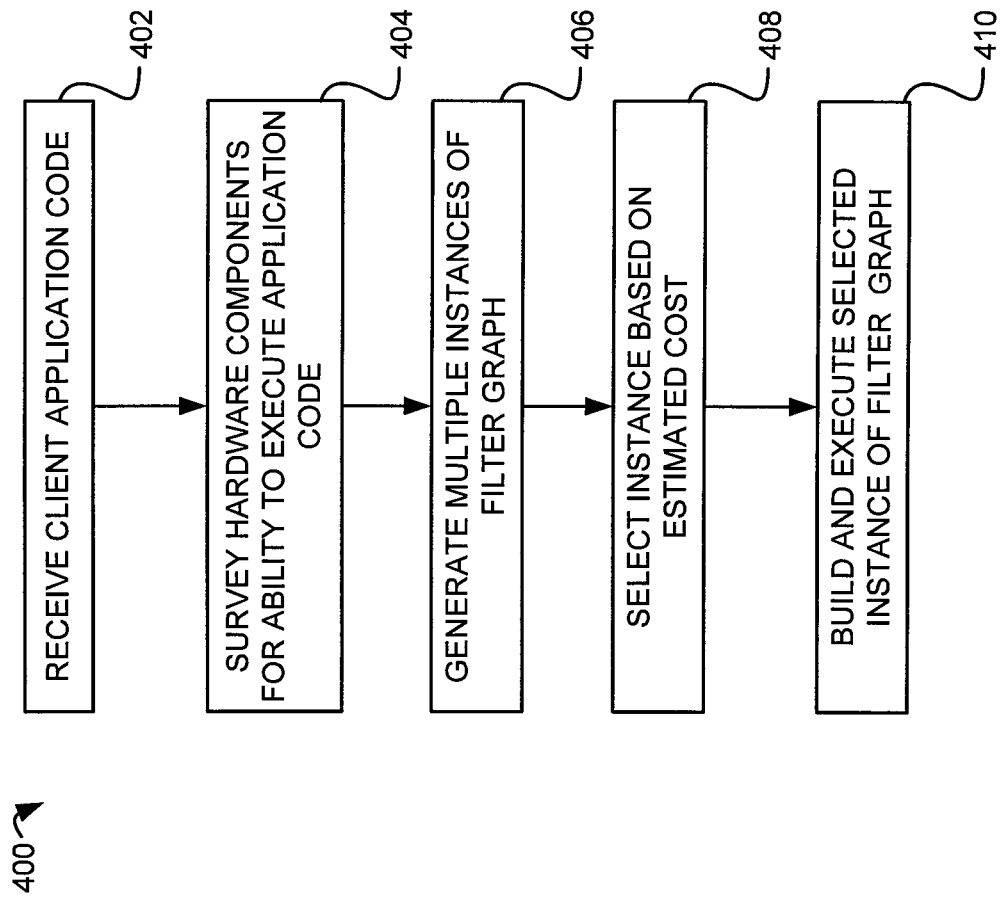
FIG. 4 is an illustration of a flow diagram of an approach according to an example embodiment.

FIG. 4 is an illustration of a flow diagram of an approach 400, according to an example embodiment. The approach 400 may be performed with a specific media input or before any media input is received. Depending on the user input, the approach 400 may be performed by the system 300, a CPU, a GPU, and/or by another resource. The approach 400 may be performed based on a new input graph 100, a change in the resource associated with the input 102, a change in the resource associated with the output 110, a change in execution sequence in the input graph 100, or a change in one or more of the parameters 108.

In an operation 402, a user input graph is received by the interface module 302. In some embodiments, the user input graph may comprise user input graph 100 or may be recalled from a file location or uniform resource locator (URL). The input graph 100 may be written in a programming language or may be assembled graphically by a user via a user interface. The user input graph 100 may be associated with a media input to be modified or may be provided without the media input.

In an operation 404, the resources are interrogated by the selector 304 to determine whether each of the resources is able to perform at least a portion of the functions specified in the input graph. The interrogation may be based on one or more preset parameters. The interrogation itself may be executed as a Boolean command. In some systems, each resource may be surveyed more than once.

In an operation 406, multiple instances of an execution graph are generated by the selector 304 and/or the inserting module 306. The multiple instances may be assembled in a graph such as graph 200 or condensed graph 250. The multiple instances of the execution graph may include those instances that are possible to perform based on the survey performed in the operation 404.

In an operation 408, one instance of the multiple instances of the execution graph may be selected by the selector 304 and/or the inserting module 306 based on an estimated cost of executing the path. "Cost" is understood as a metric corresponding to the performance of the functions or conversions within the execution graph. Examples of costs include amount of time, amount of memory, amount of transfers, precision, accuracy or quality of the output, amount of power consumed, actual monetary cost, etc. The cost estimation may be calculated using, for example, a weighted algorithm, a shortest path algorithm, a count of the number of conversions be performed, or a combination thereof.

In instances where the weighting algorithm is used, the conversions (such as conversions 214 and 218) may be weighted more heavily than the functions provided either on the CPU or the GPU in part because conversion functions are generally expensive and may include costly format conversions in order to provide the resource with an optimal layout of the data. In other instances, particularly where a number of conversions are included in each execution graph, one type of conversion may be considered more expensive than another type of conversion. For example, a conversion from an Open CL resource to an OpenGL resource may be less expensive or weighted less heavily than a conversion from a CUDA resource to a CPU. Further, some conversions directly from one resource to another may not be possible and may require a temporary conversion to a third resource. In some instances, the selection 408 may be controlled by a client application (e.g., an image processing application or an audio processing application) to restrict usage of certain resources or to force usage of only certain resources.

In an operation 410, once the least expensive execution graph is selected, an executable of the execution graph is compiled by the compiler 308 and executed using the resources specified by the execution graph. The client application and the user do not necessarily have any knowledge about which resources perform each function or about the resources locally available on the computing system. The execution graph may be modified further by a resource based on one or more parameters or attributes of the media input provided by the user.

FIGS. 5A-5D provide an illustration of an example embodiment comprising a nested function. FIG. 5A depicts an example input graph provided by a user to perform a nested function similar to the input graph 100. In input graph 500, a media input 502 is specified. As discussed above, the media input 502 may be, for example, an actual image or image file, or may be an anticipated location of an image file. In some instances, the media input 502 may allow a user to spontaneously provide a media input file or input file location. The third function 504 may represent a plurality of nested functions and an execution sequence as a single function. The parameters 506 of the third function 504 may be provided by a user or set to one or more default values. The input graph 500 may include the media output location 508 as described in connection with media output 110.

FIG. 5B depicts a function graph 510 depicting one or more subfunctions within the third function 504. Each of the subfunctions may comprise a filter or other imaging processing functions, such as described in connection with the first function 104 and the second function 106. The term "subfunction" refers to a function that is used within a composite function but may itself be a function. For example, the third function 504 may comprise three subfunctions as depicted in the function graph 510. The functions may be executed in parallel or in series. Similar to the first function 104 and the second function 106, each subfunction may have one or more inputs and one cloneable output. Each subfunction may receive one or more parameters (not shown).

As depicted in execution graph 510, a subfunction A 514 and a subfunction B 516 may both be performed first to generate output that is used as input into a subfunction C 518. In some instances, a subfunction may not receive any input. Upon receiving the outputs of subfunction A 514 and subfunction B 516, the subfunction C 518 may perform some function using both. For example, subfunction C 518 may comprise a combining function. This function graph 510 also includes a CPU output 520 similar to the CPU output 204 as described in connection with FIG. 2A.

FIG. 5C depicts a table 522 that indicates, for each subfunction of function graph 510, the results of the interrogation of operation 404 of the locally available resources. As shown in the table 522, the subfunction A 514 may be performed by the CPU or the GPU, subfunction B 516 may be performed only by the CPU, and subfunction C 518 may be performed only by the GPU. It is understood that additional resources may also be available to perform one or more of the subfunctions. The table 522 is shown for the purposes of illustration and may or may not be created or displayed to a user.

FIG. 5D depicts a graph 524 comprising multiple instances of an execution graph similar to the condensed graph 250. Based on the information summarized in table 522, the graph 524 is generated to depict each possible execution graph. The graph 524 includes two execution graphs. As depicted in table 522, subfunction A 514 may be performed by the CPU or by the GPU. This creates a branch (depicted as dotted lines) in the graph 524 where subfunction A 514 may be executed by the GPU or by the CPU. The conversions 526 and 528 have been inserted into each execution graph, as described in connection with FIG. 2A.

Once the graph 524 is generated, one of the execution graphs is selected using a shortest distance algorithm. For instance, in the example depicted, subfunction A 512 may be selected to be performed on the GPU. This allows subfunction A 512 and subfunction B 514 to be performed substantially in parallel on the GPU and the CPU, respectively. Using the selected execution graph, an executable version of the execution graph is generated and the media input is processed to generate a modified media as described above.

Figure 6:
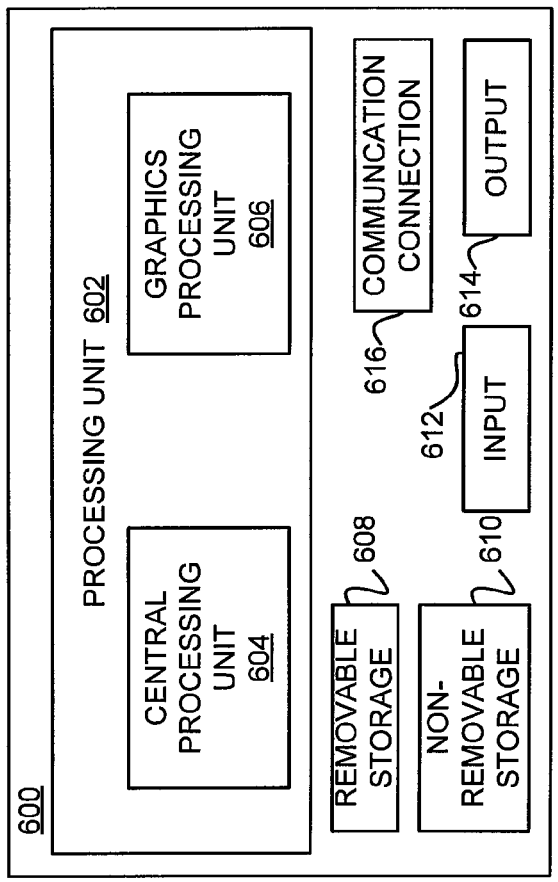
FIG. 6 is a block diagram of a computing device according to an example embodiment.

FIG. 6 is a block diagram of a computing device 600 according to an example embodiment. A computing device 600 may include processing unit 602, removable storage 608, and non-removable storage 610. The processing unit 602 may include one or more CPUs 604 and one or more GPUs 606. Removable storage 608 and/or non-removable storage 610 may include volatile memory and nonvolatile memory. Computer storage includes random access memory (RAM), read-only memory (ROM), erasable programmable read-only memory (EPROM) and electrically erasable programmable read-only memory (EEPROM), flash memory or other memory technology, compact disc read-only memory (e.g. ROM), digital versatile disks (DVD) or other optical disk storage, magnetic cassettes, magnetic tape, magnetic disk storage or other magnetic storage devices, or any other medium capable of storing computer-readable instructions. Computing device 600 may include or have access to input 612, output 614, and a communication connection 616. The computer may operate in a networked environment using the communication connection 616 to connect to one or more remote computers, such as database servers. The remote computer may include a personal computer (PC), server, router, a network PC, a peer device or other common network node, or the like. The communication connection may include a local area network (LAN), a wide area network (WAN), the Internet, or other networks.

Some embodiments may be useful to perform a predetermined set of functions on various computers without knowledge of the resources available on each of the computers. Other embodiments may be useful for more efficiently selecting resources on a computer given a set of functions to be performed.

In the foregoing detailed description, reference is made to the accompanying drawings that form a part hereof, in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the subject matter of the present application.

The foregoing description is, therefore not to be taken in a limited sense, and the scope of the inventive subject matter is defined by the appended claims.

The functions or algorithms described herein are implemented in hardware, software, or in one embodiment, a combination of software and hardware. The software comprises computer executable instructions stored on a computer readable medium such as memory or other type of storage device. Further, described functions may correspond to modules, which may include software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, router, or other device capable of processing data in the network interconnection devices.

Some embodiments implement the functions in two or more specific interconnected hardware modules or devices with related control and data signals communicated between and through the modules, or as portions of an application-specific integrated circuit. Thus, the exemplary process flows are applicable to software, firmware, and hardware implementations.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Providers (ASPs), or utility computing providers, in addition to being sold or licensed via traditional channels.

It is emphasized that the abstract is provided to comply with 37 C.F.R. §1.72 (b) requiring an Abstract that will allow the reader to quickly ascertain the nature and gist of the technical disclosure. It is submitted with the understanding that it will not be used to interpret the scope or meaning of the claims.

In the foregoing Detailed Description, various features are together in a single embodiment to streamline the disclosure. This approach of disclosure is not to be interpreted as reflecting an intention that the claimed embodiments of the inventive subject matter require more features than are expressly recited in each claim. Rather, as the following claims reflect, inventive subject matter lies in less than all features of a single disclosed embodiment. Thus, the following claims are hereby incorporated into Detailed Description, with each claim standing on its own as a separate embodiment.

In the above Detailed Description, numerous specific details are set forth to provide a thorough understanding of claimed subject matter. However, it will be understood by those skilled in the art that claimed subject matter may be practiced without these specific details. In other instances, approaches, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

It will is readily understood by those skilled in the art that various other changes in the details, material, and arrangements of the present method stages which have been described and illustrated in order to a explain the nature of the inventive subject matter may be made without departing from the principles and scope of the inventive subject matter as expressed in subjoined claims.

What is claimed is:

1. A method comprising:
   receiving a resource-independent input graph specifying one or more functions to be performed on a media input;
   determining, for each one of the one or more functions, from a plurality of resources, at least one available resource capable of executing the each one of the one or more functions;
   generating multiple instances of an execution graph, each of the multiple instances specifying a determined available resource for each of the one or more functions;
   selecting one of the multiple instances of the execution graph based on an estimated cost of executing each of the multiple instances; and
   compiling the selected instance of the execution graph for execution using the specified available resources of the selected instance.

2. The method of claim 1, further comprising:
   receiving the media input;
   executing the compiled instance of the execution graph to modify the media input according to the one or more functions; and
   providing the modified media input.

3. The method of claim 1, the generating of the multiple instances comprising modifying an execution sequence of the one or more functions based on the determining of the at least one available resource.

4. The method of claim 1, wherein the plurality of resources comprises a central processing unit (CPU) and a graphics processing unit (GPU).

5. The method of claim 1, wherein at least one of the one or more functions comprises an indication of a hardware requirement.

6. The method of claim 1 wherein the one or more functions comprises an image filter.

7. The method of claim 1, the generating of the multiple instances comprising inserting at least one conversion into at least one of the multiple instances based on the specified available resources.

8. The method of claim 7, the at least one conversion to convert an output of a first function at a first available resource to an input of a second function at a second available resource.

9. The method of claim 7, the estimated cost for each one of the multiple instances being calculated using a number of conversions inserted in the one of the multiple instances.

10. The method of claim 1, the estimated cost comprising an estimated amount of time.

11. The method of claim 1, the estimated cost comprising an estimated amount of memory.

12. The method of claim 1, the estimated cost comprising an estimated precision, accuracy, or quality.

13. The method of claim 1, the estimated cost comprising an estimated amount of power consumed.

14. The method of claim 1, the estimated cost comprising an estimated monetary cost.

15. A computer apparatus comprising;
    an interface module configured to receive a media input and a resource-independent input graph specifying one or more functions to be performed on the media input; and
    at least one processor configured to implement a selection module to:
    determine, for each one of the one or more functions, from a plurality of resources, at least one available resource capable of executing the each one of the one or more functions,
    generate multiple instances of an execution graph, each of the multiple instances specifying a determined available resource for each of the one or more functions; and select one of the multiple instances of the execution graph based on an estimated cost of executing each of the multiple instances; and the at least one processor further configured to implement a compiler module to:

compile the selected instance of the execution graph for execution using the specified available resources of the selected instance.

16. The computer apparatus of claim 15, wherein the plurality of resources comprises a central processing unit and a graphics processing unit.

17. The computer apparatus of claim 15, wherein the interface module is further to receive one or more parameters as an input to at least one function of the one or more functions.

18. The computer apparatus of claim 15, wherein each function of the one or more functions has one output.

19. The computer apparatus of claim 18, wherein the one output of each function is clonable.

20. A non-transitory computer storage medium having embodied thereon instructions executable by at least one processor of a machine to perform operations comprising:

receiving a resource-independent input graph specifying one or more functions to be performed on data;

determining, for each one of the one or more functions, from a plurality of resources, at least one available resource capable of executing the each one of the one or more functions;

generating multiple instances of an execution graph, each of the multiple instances specifying a determined available resource for each of the one or more functions;

selecting one of the multiple instances of the execution graph based on an estimated cost of executing each of the multiple instances; and compiling the selected instance of the execution graph for execution using the specified available resources of the selected instance.

21. The non-transitory computer storage medium of claim 20, the generating of the multiple instances comprising inserting at least one conversion into at least one of the multiple instances based on the specified available resources.

22. The non-transitory computer storage medium of claim 21, the at least one conversion to convert an output of a first function at a first available resource to an input of a second function at a second available resource.

* * * * *